United States Patent
Awatani

(10) Patent No.: US 9,253,427 B2
(45) Date of Patent: Feb. 2, 2016

(54) SOLID-STATE IMAGE PICKUP APPARATUS CAPABLE OF REALIZING IMAGE PICKUP WITH WIDE DYNAMIC RANGE AND AT HIGH FRAME RATE, CONTROL METHOD THEREFOR, AND STORAGE MEDIUM

(71) Applicant: CANON KABUSHIKI KAISHA, Tokyo (JP)

(72) Inventor: Yoshio Awatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/182,467

(22) Filed: Feb. 18, 2014

(65) Prior Publication Data

US 2014/0232914 A1 Aug. 21, 2014

(30) Foreign Application Priority Data

Feb. 21, 2013 (JP) ................................. 2013-032147

(51) Int. Cl.
| | |
|---|---|
| *H04N 5/225* | (2006.01) |
| *H04N 5/378* | (2011.01) |
| *H04N 5/232* | (2006.01) |
| *H04N 5/355* | (2011.01) |
| *H04N 5/363* | (2011.01) |
| *H04N 9/04* | (2006.01) |

(52) U.S. Cl.
CPC ........... *H04N 5/378* (2013.01); *H04N 5/23245* (2013.01); *H04N 5/35563* (2013.01); *H04N 5/363* (2013.01); *H04N 9/045* (2013.01)

(58) Field of Classification Search
CPC . H04N 5/2355; H04N 5/35563; H04N 5/378; H04N 5/23245; H04N 5/363; H04N 9/045
USPC .......................................................... 348/323
See application file for complete search history.

(56) References Cited

U.S. PATENT DOCUMENTS

| | | | |
|---|---|---|---|
| 8,525,906 B2 | 9/2013 | Ui | |
| 8,542,315 B2 * | 9/2013 | Sorek et al. | .................... 348/364 |
| 2002/0067416 A1 * | 6/2002 | Yoneda et al. | ................ 348/304 |
| 2004/0051790 A1 * | 3/2004 | Tamaru et al. | .............. 348/223.1 |
| 2006/0098255 A1 * | 5/2006 | Hyodo | ........................... 358/521 |

(Continued)

FOREIGN PATENT DOCUMENTS

| | | |
|---|---|---|
| JP | 2005-347932 A | 12/2005 |
| JP | 2010-028423 A | 2/2010 |

(Continued)

*Primary Examiner* — Twyler Haskins
*Assistant Examiner* — Dwight C Tejano
(74) *Attorney, Agent, or Firm* — Fitzpatrick, Cella, Harper & Scinto

(57) ABSTRACT

A solid-state image pickup apparatus which is capable of enlarging dynamic range and taking images at high frame rate. The solid-state image pickup apparatus has a pixel unit having first pixels with a first sensitivity to the light and second pixels with a second sensitivity lower than the first sensitivity, and the first pixels and the second pixels being alternately arranged in a row direction. Pixel signals are read out from the first pixels as first pixel signals, and analog-to-digital conversion of the first pixel signals is performed to obtain first digital signals. Pixel signals are read out from the second pixels as second pixel signals, and analog-to-digital conversion of the second pixel signals is performed to obtain second digital signals. The first digital signals and the second digital signals are output as image data.

14 Claims, 7 Drawing Sheets

(56) References Cited

U.S. PATENT DOCUMENTS

| | | | |
|---|---|---|---|
| 2008/0093533 A1* | 4/2008 | Onodera | 250/208.1 |
| 2008/0173794 A1* | 7/2008 | Oike et al. | 250/208.1 |
| 2011/0001861 A1 | 1/2011 | Tanaka et al. | |
| 2013/0208147 A1* | 8/2013 | Koshiba | 348/239 |
| 2013/0313411 A1 | 11/2013 | Ui | |

FOREIGN PATENT DOCUMENTS

| | | |
|---|---|---|
| JP | 2011-015219 A | 1/2011 |
| WO | WO2012042967 A1 * | 4/2012 |

* cited by examiner

FIG.6

| | CAMERA POWER-OFF | NON-RECORDING OPERATION | RECORDING OPERATION (WIDE DYNAMIC RANGE IMAGE PICKUP) | RECORDING OPERATION (NON-WIDE DYNAMIC RANGE IMAGE PICKUP) |
|---|---|---|---|---|
| UPPER AD | POWER OFF | | POWER ON | |
| LOWER AD | POWER OFF | POWER OFF | POWER ON | POWER OFF |
SOLID-STATE IMAGE PICKUP APPARATUS CAPABLE OF REALIZING IMAGE PICKUP WITH WIDE DYNAMIC RANGE AND AT HIGH FRAME RATE, CONTROL METHOD THEREFOR, AND STORAGE MEDIUM

BACKGROUND OF THE INVENTION

1. Field of the Invention

The present invention relates to a solid-state image pickup apparatus, a control method therefor, and a computer-readable storage medium storing a control program for implementing the control method, and in particular to a solid-state image pickup apparatus having analog-to-digital converters in respective columns.

2. Description of the Related Art

In general, an image obtained by shooting in a case where there is an object (subject) with high brightness such as a headlight or sunlight within a shooting area is required to have no so-called blown out highlights and also required to have no blocked up shadows in a low-brightness range. Namely, at the time of shooting, an image with wide dynamic range is required.

To obtain an image with wide dynamic range, first, a low-sensitivity image suitable for a subject with a high brightness and a high-sensitivity image suitable for a subject with a low brightness are obtained. The images of these two types are subjected to image processing to generate an image with wide dynamic range. Accordingly, solid-state image pickup apparatuses such as CMOS image sensors capable of obtaining a low-sensitivity image and a high-sensitivity image are needed.

Additionally, in general, progressive moving images of 30 Hz and interlace moving images of 60 Hz have been conventionally used as moving images, and with speed-up of a display device, solid-state image pickup apparatuses capable of taking progressive moving images of 60 Hz and images at high frame rate not less than 60 Hz have been required.

If images can be taken at high frame rate, motions of a subject moving at high speed can be accurately captured. If a solid-state image pickup apparatuses capable of taking images at high frame rate is used, a plurality of images can be synthesized to enable image processing such as improvement of the S/N ratio and enlargement of dynamic range.

There have been solid-state image pickup apparatuses in which two or more analog-to-digital converters (ADC) are provided in each pixel column, and outputs from a plurality of pixels in a pixel column are allocated to these ADCS, so that speed can be increased by parallel processing (see Japanese Laid-Open Patent Publication (Kokai) No. 2005-347932).

There have also been solid-state image pickup apparatuses in which a unit pixel has a first photodiode that photoelectrically converts incident light and accumulates the same and a second photodiode with lower sensitivity to light as compared to the first photodiode. Here, when signal electric charges in the first and second photodiodes are to be read out, there are a high-sensitivity mode in which a signal obtained by amplifying a potential obtained by reading out and adding up the signal electric charges together is output, and a low-sensitivity mode in which a potential obtained by amplifying a potential obtained by reading the signal electric charges in the second photodiode is output (see Japanese Laid-Open Patent Publication (Kokai) No. 2011-15219). As a result, when the amount of incident light is small, sensitivity is increased, and when the amount of incident light is large, sensitivity is decreased so that saturation of outputs can be avoided to widen dynamic range.

Further, there have been solid-state image pickup apparatuses which, in order to enlarge dynamic range, have a plurality of split pixels obtained by dividing one pixel in a pixel unit, in which a plurality of pixels is arranged in a matrix, into areas in which electric charges in different amounts are accumulated, and at the time of reading pixel signals, read out split pixel signals of the respective split pixels, subject the split pixel signals to A/D conversion, and add them up to obtain a pixel signal of one pixel (see Japanese Laid-Open Patent Publication (Kokai) No. 2010-28423).

As described above, Japanese Laid-Open Patent Publication (Kokai) No. 2005-347932 describes the method for taking images at high frame rate, and Japanese Laid-Open Patent Publication (Kokai) No. 2011-15219 and Japanese Laid-Open Patent Publication (Kokai) No. 2010-28423 describe the method for enlarging dynamic range, but they do not mention taking of images at high frame rate while enlarging dynamic range.

In particular, when one pixel has a plurality of photodiodes as with the method described in Japanese Laid-Open Patent Publication (Kokai) No. 2011-15219 and Japanese Laid-Open Patent Publication (Kokai) No. 2010-28423, it is difficult to read out pixel signals at high frame rate.

SUMMARY OF THE INVENTION

The present invention provides a solid-state image pickup apparatus and a control method therefor, which are capable of enlarging dynamic range and taking images at high frame rate, as well as a computer-readable storage medium storing a control program for implementing the control method.

Accordingly, a first aspect of the present invention provides a solid-state image pickup apparatus that has a pixel unit in which a plurality of pixels is arranged in a two-dimensional matrix and obtains image data based on pixel signals output from the pixels according to amounts of light incident on the pixels, comprising the pixel unit configured to have first pixels having a first sensitivity to the light and second pixels having a second sensitivity lower than the first sensitivity, the first pixels and the second pixels being alternately arranged in a row direction, a first signal processing unit configured to, when reading out the pixel signals from the pixel unit, read out the pixel signals from the first pixels as first pixel signals and perform analog-to-digital conversion of the first pixel signals to obtain first digital signals, a second signal processing unit configured to, when reading out the pixel signals from the pixel unit, read out the pixel signals from the second pixels as second pixel signals and perform analog-to-digital conversion of the second pixel signals to obtain second digital signals, and an output unit configured to output the first digital signals and the second digital signals as image data.

Accordingly, a second aspect of the present invention provides a control method for a solid-state image pickup apparatus that has a pixel unit in which a plurality of pixels is arranged in a two-dimensional matrix and obtains image data based on pixel signals output from the pixels according to amounts of light incident on the pixels, the pixel unit having first pixels having a first sensitivity to the light and second pixels having a second sensitivity lower than the first sensitivity, the first pixels and the second pixels being alternately arranged in a row direction, comprising a first signal processing step of, when reading out the pixel signals from the pixel unit, reading out the pixel signals from the first pixels as first pixel signals and performing analog-to-digital conversion of the first pixel signals to obtain first digital signals, a second signal processing step of, when reading out the pixel signals from the pixel unit, reading out the pixel signals from the second pixels as second pixel signals and performing analog-to-digital conversion of the second pixel signals to obtain second digital signals, and an output step of outputting the first digital signals and the second digital signals as image data.

Accordingly, a third aspect of the present invention provides a non-transitory computer-readable storage medium storing a control program for causing a computer to implement a control method for a solid-state image pickup apparatus that has a pixel unit in which a plurality of pixels is arranged in a two-dimensional matrix and obtains image data based on pixel signals output from the pixels according to amounts of light incident on the pixels, the pixel unit having first pixels having a first sensitivity to the light and second pixels having a second sensitivity lower than the first sensitivity, the first pixels and the second pixels being alternately arranged in a row direction, the control method comprising a first signal processing step of, when reading out the pixel signals from the pixel unit, reading out the pixel signals from the first pixels as first pixel signals and performing analog-to-digital conversion of the first pixel signals to obtain first digital signals, a second signal processing step of, when reading out the pixel signals from the pixel unit, reading out the pixel signals from the second pixels as second pixel signals and performing analog-to-digital conversion of the second pixel signals to obtain second digital signals, and an output step of outputting the first digital signals and the second digital signals as image data.

According to the present invention, because read-out from the first pixels with the first sensitivity and the second pixels with the second sensitivity is controlled independently of each other to output the first digital signals and the second digital signals, an image with wide dynamic range can be obtained by synthesizing the first digital signals and the second digital signals together. Further, because read-out from the first pixels and the second pixels is controlled independently of each other, that is, because the first digital signals and the second digital signals are output independently of each other, the first digital signals and the second digital signals can be output at high frame rate, and as a result, images can be taken at high frame rate.

Further features of the present invention will become apparent from the following description of exemplary embodiments (with reference to the attached drawings).

BRIEF DESCRIPTION OF THE DRAWINGS

FIGS. 2A and 2B are diagrams schematically showing an arrangement of pixels in a pixel unit appearing in FIG. 1, in which FIG. 2A shows an exemplary pixel arrangement, and FIG. 2B shows another exemplary pixel arrangement.

FIG. 6 is a view useful in explaining how a camera having the solid-stage image pickup apparatus appearing in FIG. 1 provides control appropriate to operation modes of the camera.

DESCRIPTION OF THE EMBODIMENTS

A description will now be given of an exemplary image pickup apparatus according to an embodiment of the present invention with reference to the drawings.

Figure 1:
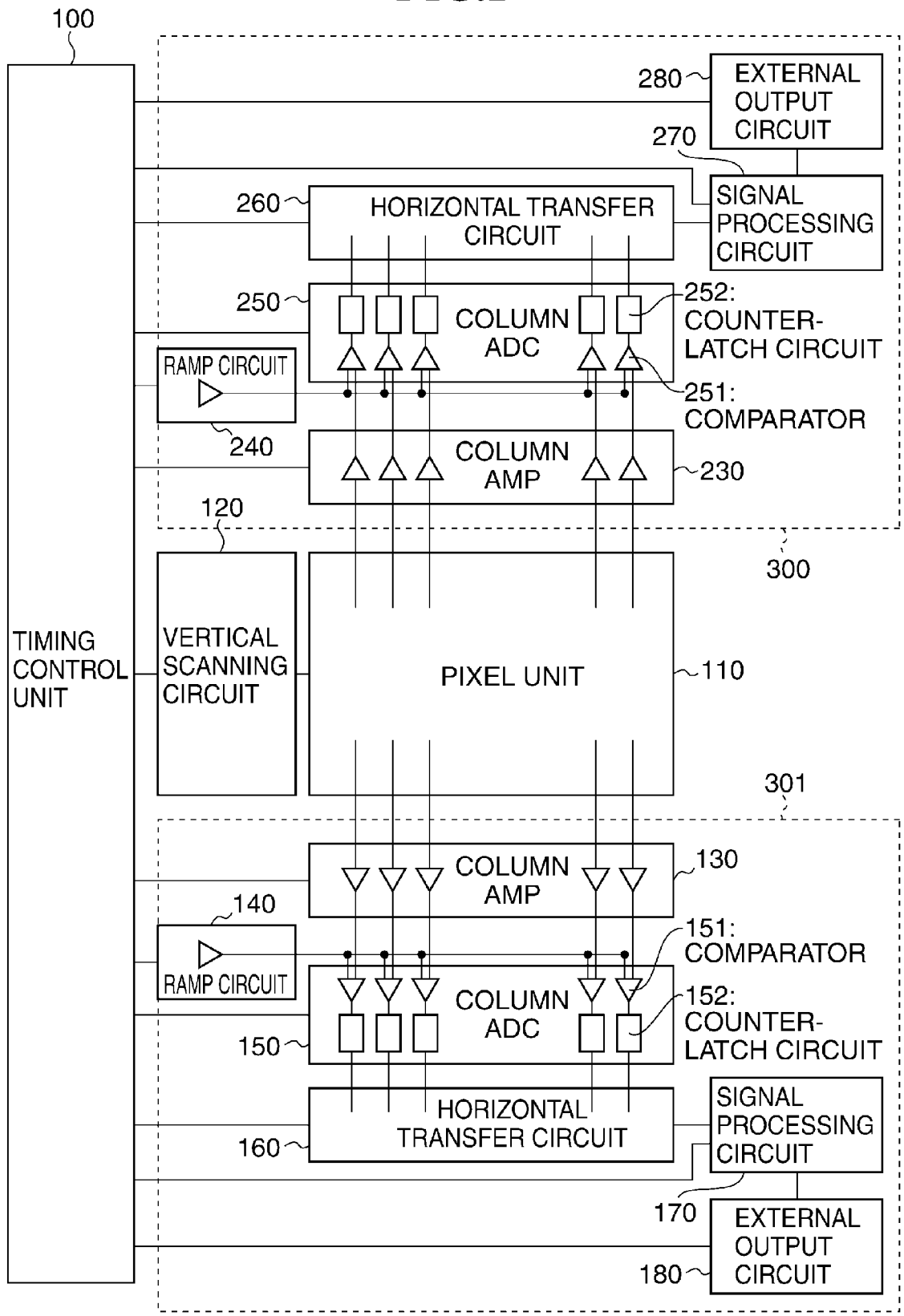
FIG. 1 is a block diagram schematically showing an arrangement of an exemplary solid-stage image pickup apparatus according to an embodiment of the present invention.

FIG. 1 is a block diagram schematically showing an arrangement of the exemplary image pickup apparatus according to the embodiment of the present invention. It should be noted that the solid-state image pickup apparatus shown in the figure is a so-called parallel type ACD CMOS image sensor in which a plurality of pixels is arranged in a two-dimensional matrix, and analog-to-digital converters (ADC) are provided in respective columns. A timing control unit 100 is connected to the solid-state image pickup apparatus.

The solid-state image pickup apparatus has a pixel unit 110 in which a plurality of pixels is arranged in a two-dimensional matrix. Further, the solid-state image pickup apparatus also has a vertical scanning circuit 120, column amplifiers (column AMPs) 130 and 230, ramp circuits 140 and 240, column ADCs 150 and 250, horizontal transfer circuits 160 and 260, signal processing circuits 170 and 270, and external output circuits 180 and 280. As shown in the figure, the column ADCs 150 are provided for respective columns of the pixel unit 110, and each of the column ADCs 150 has a comparator 151 and a counter-latch circuit 152. Likewise, each of the column ADCs 250 has a comparator 251 and a counter-latch circuit 252.

It should be noted that the column AMPs 130 and 230 each are provided for the respective columns of the pixel unit 110. Namely, the column AMPs 130 and 230 are connected to a vertical read-out line, to be described later.

The solid-state image pickup apparatus showing in the figure is configured to be vertically symmetric with respect to the pixel unit 110, and hence the following description of the solid-state image pickup apparatus will be given with attention focused on component elements located under the pixel unit 110. Namely, blocks 300 and 301 enclosed by broken lines in the figure are identical in arrangement, and here, description of the solid-state image pickup apparatus will be given with attention focused on the block 301.

The pixel unit 110 is a photoelectric conversion element that outputs electric charge, which corresponds to the amount of light from an optical image (subject image), as a voltage signal. The timing control unit 100 controls operation clock signals (CLK) and timing signals which are supplied to the solid-state image pickup apparatus.

The vertical scanning circuit 120 carries out timing control to successively read voltage signals (hereafter referred to sometimes as pixel signals) in one frame from the pixel unit 110 under the control of the timing control unit 100. In general, pixel signals are read out on a row-by-row basis in one frame from a row on an upper side to a row on a lower side as viewed in the figure.

The column AMPs 130 amplify voltage signals (pixel signals), which are read out from the pixel unit 110, on a column-by-column basis. Signals level is increased by the column AMP 130s amplifying the voltage signals. As a result, the S/N ratio is equivalently increased with respect to noise from the ramp circuit 140 and the column ADCs 150 in succeeding stages.

The column AMPs 130, however, are not indispensable for a circuit arrangement in which noise from the ramp circuit 140 and the column ADCs 150 is sufficiently low with respect to noise generated by the pixel unit 110.

The ramp circuit 140 generates a ramp signal having a constant slope (inclination) in the direction of time. The column ADCs 150 compare output signals (amplified signals) from the column AMPs 130 with the ramp signal from the ramp circuit 140. Based on results of the comparison, the comparators 151 then output comparison result signals.

The counter-latch circuits 152 perform counting for time periods appropriate to the comparison result signals. This counting operation obtains count values proportional to levels of the amplified signals. The count values, which are A/D conversion results (analog-to-digital conversion processing results), are then latched (held) as image data by the counter-latch circuits 152.

The image data of one line held by the counter-latch circuits 152 are successively read out by the horizontal transfer circuit 160. Outputs (read-out signals) from the horizontal transfer circuit 160 are input to the signal processing circuit 170.

The signal processing circuit 170, which is a circuit that digitally performs signal processing, adds a predetermined amount of offset to the read-out signal, and also performs shift operations and multiplication to perform gain operations. A processed signal (multi-bit parallel signal), which is output from the signal processing circuit 170, is sent to the external output circuit 180.

The external output circuit 180 converts a parallel signal, which is an output from the signal processing circuit 170, into a serial signal. The external output circuit 180 then converts the serial signal into an LVDS (low voltage difference signal processing) signal or the like and outputs the same to an external device by high-speed serial communication.

Figure 2A:
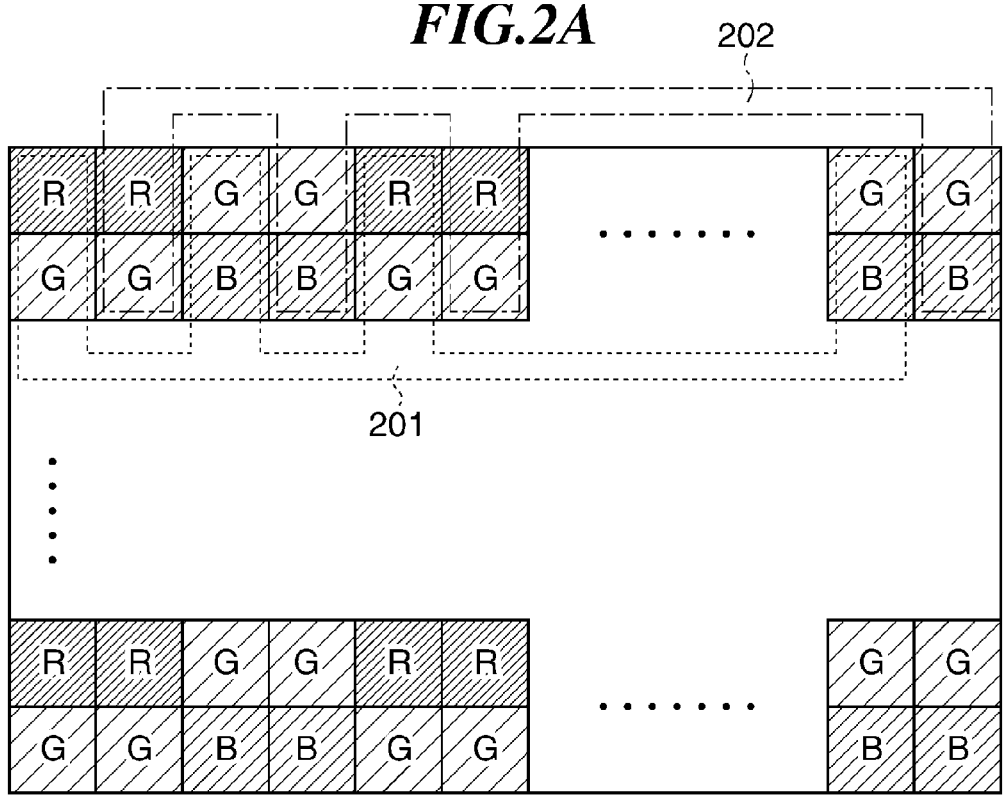
Figure 2B:
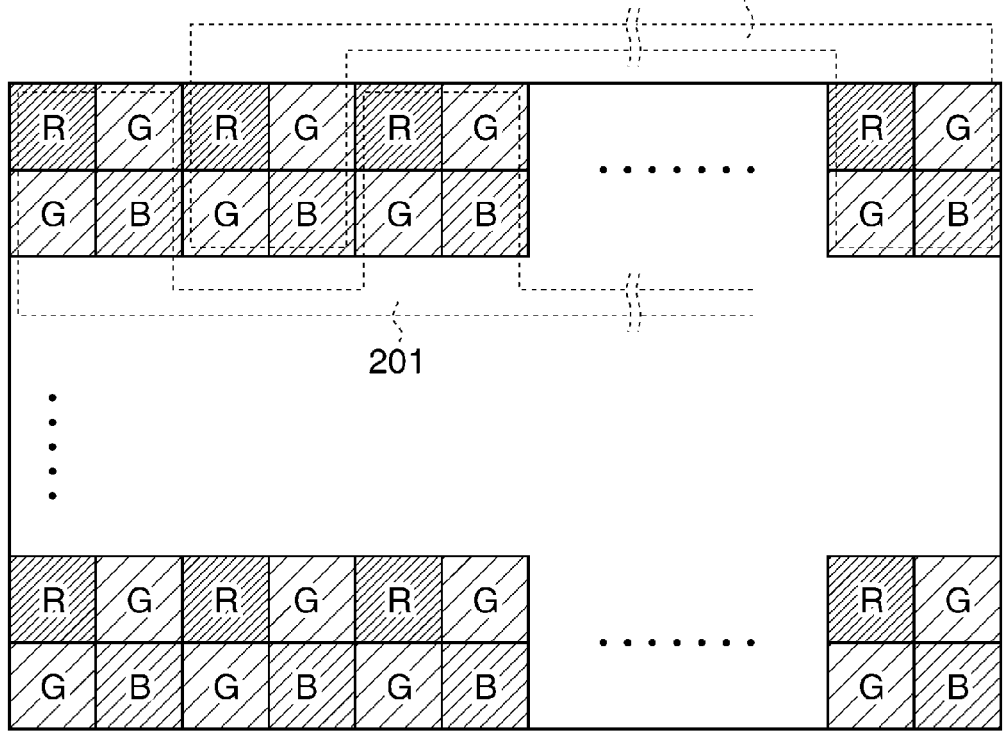

FIGS. 2A and 2B are diagrams schematically showing an arrangement of pixels in the pixel unit 110 appearing in FIG. 1, in which FIG. 2A shows an exemplary pixel arrangement, and FIG. 2B shows another exemplary pixel arrangement.

Referring to FIGS. 2A and 2B, a color filter and a microlens are mounted on a surface of each pixel. Here, color filters of three colors consisting of R (red), G (green), and B (blue) are used, and a so-called Bayer pattern using RGB primary colors filter is adopted.

A pattern appearing in FIG. 2A or 2B is used as the Bayer pattern. In the example shown in FIG. 2A, each set is comprised of two columns; in odd-numbered sets, R and G color filters are alternately arranged in a column direction, and in even-numbered sets, G and B color filters are alternately arranged in a column direction. The odd-numbered columns form first Bayer groups 201, and the even-numbered columns form second Bayer groups 202.

Namely, first pixel groups (the first Bayer groups 201) having a first sensitivity and second pixel groups (the second Bayer groups 202) having a second sensitivity lower than the first sensitivity are alternately arranged in a row direction.

In the example shown in FIGS. 2B, R and G color filters are alternately arranged in a column direction in odd-numbered columns, and G and B color filters are alternately arranged in a column direction in even-numbered columns. With two columns forming one set, odd-numbered sets form first Bayer groups 201, and even-numbered sets form second Bayer groups 202.

Namely, first pixel groups (first Bayer groups 201) having a first sensitivity and second pixel groups (second Bayer groups 202) having a second sensitivity lower than the first sensitivity are alternately placed in a row direction.

When pixels with different sensitivities to light are to be formed, for example, sensitivities to light are made different by varying aperture ratios of photoelectric conversion elements provided in the pixels or varying concentrations of impurities in a substrate. Further, sensitivities to light may be made different by varying optical characteristics using color filters or microlenses provided in the pixels.

Figure 3:
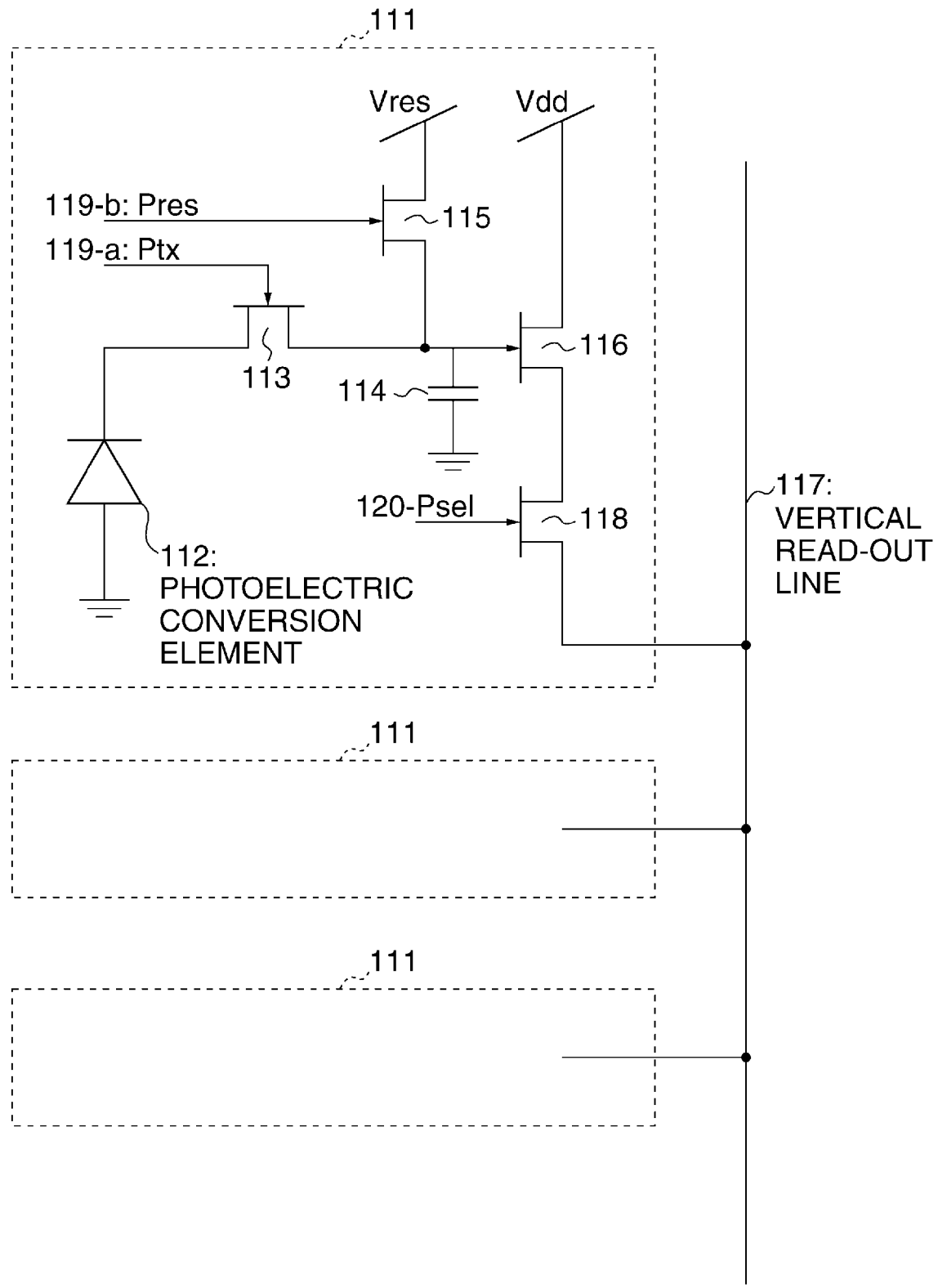
FIG. 3 is a view useful in explaining the arrangement of pixels in the pixel unit appearing in FIG. 1.

FIG. 3 is a view useful in explaining arrangement of pixels 111 in the pixel unit 110 appearing in FIG. 1.

As described earlier, the pixel unit 110 is comprised of a plurality of pixels (also referred to as unit pixels) arranged in a two-dimensional matrix (in the example shown in FIG. 3, the pixels 111 in one column are shown). The pixels 111 each have a photodiode (PD) 112 which is a photoelectric conversion element, and the PD 112 accumulates electric charge corresponding to the amount of incident light. A transfer transistor (Ptx-Tr) 113 transfers electric charge accumulated in the PD 112 to a floating diffusion (FD) 114. When the transfer pulse Ptx of a transfer control line 119-a reaches a high level (H level), the Ptx-Tr 113 is turned on to transfer electric charge from the PD 112 to the FD 114. The electric charge is then converted into voltage by the FD 114.

A reset transistor (RST-Tr) 115 resets the FD 114 according to a reset pulse Pres of a reset control line 119-b. Before electric charge is transferred from the PD 112 to the FD 114, the level of the FD 114 is reset to a reset level (Vres) by the RES-Tr 115.

The level of the FD 114 before reset is canceled to turn on the Ptx-Tr 113 is referred to as the N level, and the level of the FD 114 after the Ptx-Tr 113 is turned on transfer electric charge from the PD 112 is referred to as the S level. A differential value between the N level and the S level is obtained by signal processing, to be described later, and as a result, handled as an image signal proportional to the amount of light.

A source follower transistor (SF-Tr) 116 is a driver circuit for transferring an output voltage of the FD 114 to a circuit in a succeeding stage. A vertical read line 117 is connected to inputs of the column AMPs 130 and shared by the plurality of pixels 111 arranged in the column direction.

By providing on-off control of a selection transistor (SEL-Tr) 118, the SF-Tr 116 of a pixel other than pixels desired to be read out is detached from the vertical read line 117. As a result, pixel signals are selectively read out from the plurality of pixels 111 arranged in the column direction. The SEL-Tr 118 is on-off controlled by selection signals (120-Psel signals).

It should be noted that the transfer signal, the reset signal, and the selection signal described above are supplied to from the vertical scanning circuit 120 to the pixel unit 110 under the control of the timing control unit 100.

Figure 4:
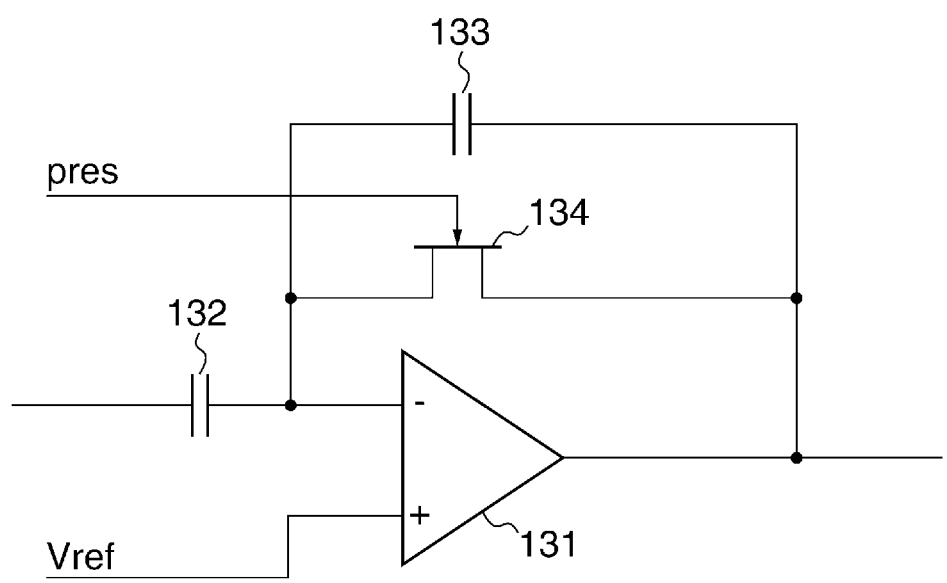
FIG. 4 is a circuit diagram showing an exemplary arrangement of a column AMP appearing in FIG. 1.

FIG. 4 is a circuit diagram showing an exemplary arrangement of the column AMP appearing in FIG. 1.

With attention focused on the column AMP 130, the column 130 has an AMP 131, a first capacity 132, a second capacity 133, and a rest switch 134. A reference voltage (Vref) is applied to a plus (+) terminal of the AMP 131, and the first capacity 132 is connected to a minus (−) terminal of the AMP 131.

First, in a time period during which the FD 114 is reset by the RST-Tr 115, the reset switch 134 is turned on. As a result, electric charge accumulated in the second capacity 133, which is a feedback capacity, is reset.

Subsequently, when the reset switch 134 is turned off, the column AMP 130 acts as an amplifier, so that the voltage applied to the first capacity 132 which is an input capacity appears at an output end of the AMP 131 at a voltage level appropriate to a capacity ratio of the first capacity 132 to the second capacity 133.

Actually, the level of the reset pulse Pres becomes low level (L level), and the reset switch 134 is turned off with resetting of the FD 114 canceled. As a result, a reset noise generated by resetting the FD 114 is stored in the first capacity 132. This reset noise is superposed on results of both N conversion and S conversion in A/D conversion, to be described later, and thus can be removed by a CDS operation (calculation of S conversion–N conversion), to be described later.

In N conversion, an N level of a selected pixel (reset level before the Ptx-Tr 113 is brought into a state of conduction) is input to the first capacity 132 via the vertical read-out line 117. As a result, a voltage signal with the N level amplified is output to an output end of the column AMP 130. The voltage signal with the N level amplified is subjected to A/D conversion by the column ADC circuit 150 (a result of this A/D conversion is referred to as N-AD).

In S conversion, the transfer pulse Ptx reaches a high level (H level), and the PTx-Tr113 is brought into a state of conduction. As a result, an S level corresponding to electric charge accumulated in the PD 112 (signal level after the Ptx-Tr 113 is brought into the state of conduction) is input to the first capacity 132 via the vertical read line 117. As a result, a voltage signal with the S level amplified is output to an output end of the column AMP 130. The voltage signal with the S level amplified is subjected to A/D conversion by the column ADC circuit 150 (a result of this A/D conversion is referred to as S-AD).

Figure 5:
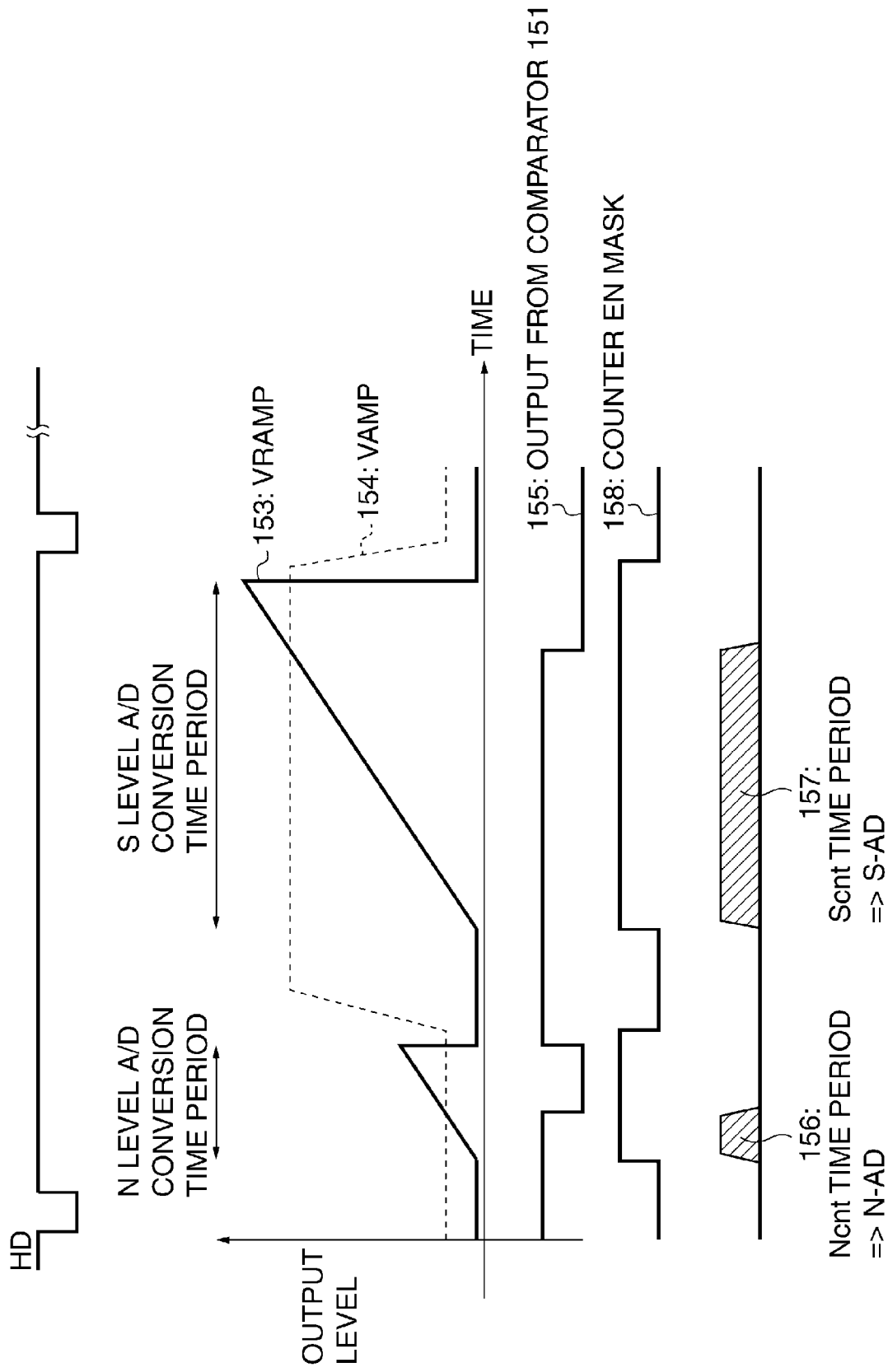
FIG. 5 is a timing chart useful in explaining how a column ADC appearing in FIG. 1 operates.

FIG. 5 is a timing chart useful in explaining how the column ADC appearing in FIG. 1 operates.

In the column ADC 150, the comparator 151 compares a ramp signal voltage (hereafter referred to merely as a ramp voltage: VRAMP) 153 generated by the ramp circuit 140 and an output (VAMP) 154 from the column AMP 130 with each other. The counter-latch circuit 152 then counts a time period that elapses before an output from the comparator 151 is inverted, and latches the resulting count value. The counter-latch circuit 152, which has a plurality of latches, is capable of accumulating a plurality of A/D data (A/D conversion results).

When the level of the VRAMP 153 is lower than that of the VAMP 154, the comparator 151 outputs an H level as a comparison result signal 155. On the other hand, when the level of the VRAMP 153 is equal to or higher than that of the VAMP 154, the comparator 151 outputs an L level as the comparison result signal 155.

On this occasion, during a time period for which a counter EN (enable) mask signal 158 is at H level, the counter-latch circuit 152 is caused to perform a counter operation (counting-up operation) until an output from the comparator 151 is inverted, so that a value proportional to the level of the VAMP 154 is subjected to A/D conversion and converted into a count value (digital value).

Although in the above description, an S-level voltage signal is subjected to A/D conversion, the same applies to A/D conversion of an N-level voltage signal. As a result, in an Ncnt time period 156, counting of a N-level voltage signal is performed to obtain N-AD. In an Scnt time period 157, counting of S-level voltage signals is performed to obtain S-AD.

Here, a conversion gain for voltage and a digital code (A/D conversion gain) is controlled according to the gradient of VRAMP. Namely, the greater the gradient of VRAMP, the lower the sensitivity to a change in VAMP output per LSB of a count value (digital value). On the other hand, the smaller the gradient of VRAMP, the higher the sensitivity to a change in VAMP output per LSB of a digital value. By using these characteristics, gain operation can be performed.

In the column AMP 150 shown in the figure, the bit count of an AD output varies according to CLK frequency that operates a counter. Namely, as CLK frequency increases, the value countable by the counter-latch circuit 152 during an H level time period increases, and thus, the bit count of an AD output varies according to CLK frequency. Therefore, the bit count of an AD output can be increased and decreased step by step by increasing and decreasing the operating frequency (CLK frequency) of the counter-latch circuit 152 step by step.

Thus, when bit accuracy is required of an output from the solid-state image pickup apparatus, the number of bits is increased by increasing operation frequency. On the other hand, when bit accuracy is not required, power consumption can be reduced by decreasing operation frequency.

For example, when the solid-state image pickup apparatus shown in the figure is mounted on a camera or a video camera, bit accuracy should be improved by increasing operating frequency in a case where a subject is shot and recorded using the camera or the video camera.

On the other hand, in a case where an image taken by shooting a subject is not to be recorded, a user merely identifies an image, which is an output from the solid-state image pickup apparatus, with his or her eyes via a UI (user interface) such as a display panel, and bit accuracy is decreased by decreasing operating frequency based on a determination that the ease of visual reorganization is not affected even when the bit count of an AD output is small.

By the sequential operations described above, A/D conversion is performed on an N level of a pixel to obtain N-AD. Also, A/D conversion is performed on an S level of a pixel to obtain S-AD.

The counter-latch circuit 152 stores N-AD and S-AD, and the horizontal transfer circuit 160 sequentially reads A/D conversion results (N-AD and S-AD) latched by a plurality of column ADCs 150 and sends them to the signal processing circuit 170.

The signal processing circuit 170 performs so-called CDS (correlated double sampling) by subtracting (N-AD) from (S-AD) with respect to each pixel. The signal processing circuit 170 superimposes a predetermined amount of offset on image data so as to adjust the black level thereof and performs multiplication for gain adjustment. The signal processing circuit 170 then outputs a processed signal to the external output circuit 180.

Although in the example described above, S-AD and N-AD are latched independently of each other, and then read out and subjected to CDS processing, the counter-latch circuit 152 may perform CDS processing by counting as long as the counter-latch circuit 152 is equipped with an up-down counter.

As described earlier, in the pixel unit 110, the sensitivity of the first Bayer group 201 to light (photoelectric conversion characteristics) is higher than that of the second Bayer group 202. Thus, by varying the sensitivities of the first Bayer group 201 and the second Bayer group 202 to light, image data with wide dynamic range can be generated.

Namely, by varying the sensitivities of the first Bayer group 201 and the second Bayer group 202 to light, an image with low sensitivity can be obtained even from a bright subject without causing so-called blown out highlights. On the other hand, an image with high sensitivity can be obtained even from a dark subject without causing so-called blocked up shadows.

In the solid-state image pickup apparatus appearing FIG. 1, the blocks 300 and 301 are disposed with the pixel unit 110 at a center. In the following description, the block 300 will be referred to as an upper AD 300, and the block 301 will be referred to as a lower AD 301. Here, the upper AD 300 performs reading relating to the first Bayer group 201, and the lower AD 301 performs reading relating to the second Bayer group 202.

In the upper AD 300 and the lower AD 301, the column AMP circuits 130 and 230 have different gains, and the ramp circuits 140 and 240 output ramp signals whose gradients are different.

As a result, different A/D conversion gains can be set for image data generated according to a second pixel signal output from a low-sensitivity pixel (second pixel) and image data generated according to a first pixel signal output from a high-sensitivity pixel (first pixel).

In general, in the column AMP circuits 130 and 230, gains are switched by changing capacities. For this reason, a gain switching step in the column AMP circuits 130 and 230 is rough.

On the other hand, in the ramp circuits 140 and 240, gain switching using gradients (slopes) can be controlled in an analog fashion. For this reason, a gain switching step in the ramp circuits 140 and 240 is fine, but it is difficult to widen dynamic range.

Accordingly, here, both of them are combined together to adjust A/D conversion gains. Namely, gains are roughly adjusted in the column AMP circuits 130 and 230, and gains are finely adjusted using gradients in ramp circuits 140 and 240.

Thus, by adjusting A/D conversion gains using the column AMPs 130 and 230 and the ramp circuits 140 and 240, arbitrary gains can be set in the first Bayer group 201 and the second Bayer group 202 independently of each other. Thus, although the first Bayer group 201 and the second Bayer group 202 have different sensitivities, outputs from the first Bayer group 201 and the second Bayer group 202 can be made substantially different by adjusting gains using the column AMP circuits 130 and 230 and the ramp circuits 140 and 240.

It should be noted that gains may be adjusted using the column AMP circuits 130 and 230 or the ramp circuits 140 and 240.

Moreover, in the upper AD 300 and the lower AD 301, by causing the counter-latch circuits 152 and 252 to perform counting at different operation frequencies, bit accuracies of image data generated according to the firsts Bayer group 201 and the second Bayer group 202 can be made different.

Thus, in the solid-state image pickup apparatus appearing in FIG. 1, because there are pixel groups with different sensitivities to light (the first Bayer group 201 and the second Bayer group 202), and outputs from the first Bayer group 201 and the second Bayer group 202 are subjected to A/D conversion and output using the column AMP circuits 130 and 230 and the column ADCs 150 and 250, high-sensitivity images and low-sensitivity images required to generate image data with wide dynamic range can be generated at high frame rate.

Further, at the time of shooting, when wide dynamic range is not required, image data should be generated using one of the upper AD 300 and the lower AD 301, and by stopping operation of the upper AD 300 and the lower AD 301, power consumption can be reduced. The way in which the solid-state image pickup apparatus is controlled may be varied according to operation modes of the camera.

FIG. 6 is a view useful in explaining how the solid-state image pickup apparatus appearing in FIG. 1 is controlled according to operation modes of a camera on which the solid-state image pickup apparatus appearing in FIG. 1 is mounted.

When the power to the camera is off, the upper AD 300 and the lower AD 301 is automatically powered off.

Assume now that when moving images or still images are to be taken by a camera, image data is not recorded in a hard disk or a nonvolatile memory provided in the camera. Examples of this case include a case where panning or zooming is performed without recording image data so as to determine the angle of view at the time of shooting, and a case where lens aperture is adjusted so as to adjust exposure. This is referred to as the time of non-recording.

At the time of non-recording, a user visually recognizes an image via a display unit such as a liquid crystal panel provided in the camera. On this occasion, the display unit provided in the camera has a lower resolution than that of image data to be recorded, and it is difficult for the user to recognize, for example, degradation of the S/N ratio of an image shown on the display unit.

Thus, at the time of non-recording (non-recording operation state), for example, the upper AD 300 is controlled to be powered on (ON), and the lower AD 301 is controlled to be powered off. An image corresponding to an output (image data) from the upper AD 300 is then displayed on the display unit.

The user looks at the image displayed on the display unit and then performs shooting and recording. When shooting is to be performed with a wide dynamic range (dynamic range determined in advance) in a shooting and recording operation (referred to merely as a recording operation), the lower AD 301 as well is controlled to be powered on. Namely, both the upper AD 300 and the lower AD 301 are controlled to be powered on. As a result, shooting can be performed with wide dynamic range, and in the case of moving images, images are taken at high frame rate.

A certain range of dynamic range to be used in shooting may be prescribed according to a shooting mode. Namely, control may be provided such that one of the upper AD 300 and the lower AD 301 is turned off depending on a shooting mode.

It should be noted that at the time of recording, when an image is to be taken with a non-wide dynamic range (a dynamic range other than a dynamic range determined in advance), only the upper AD 300 is controlled to be powered on, and the lower AD 301 is controlled to be power off.

In this way, at the time of non-recording, one of the upper AD 300 and the lower AD 301 is stopped, and hence power consumed by the camera can be reduced.

It should be noted that although in the example described above, a high-sensitivity image and a low-sensitivity image are obtained so as to obtain an image with wide dynamic range, two image data may be obtained with the first Bayer group 201 and the second Bayer group 202 configured to the same sensitive to light. By synthesizing these image data, a composite mage with a high S/N ratio can be generated.

Figure 7:
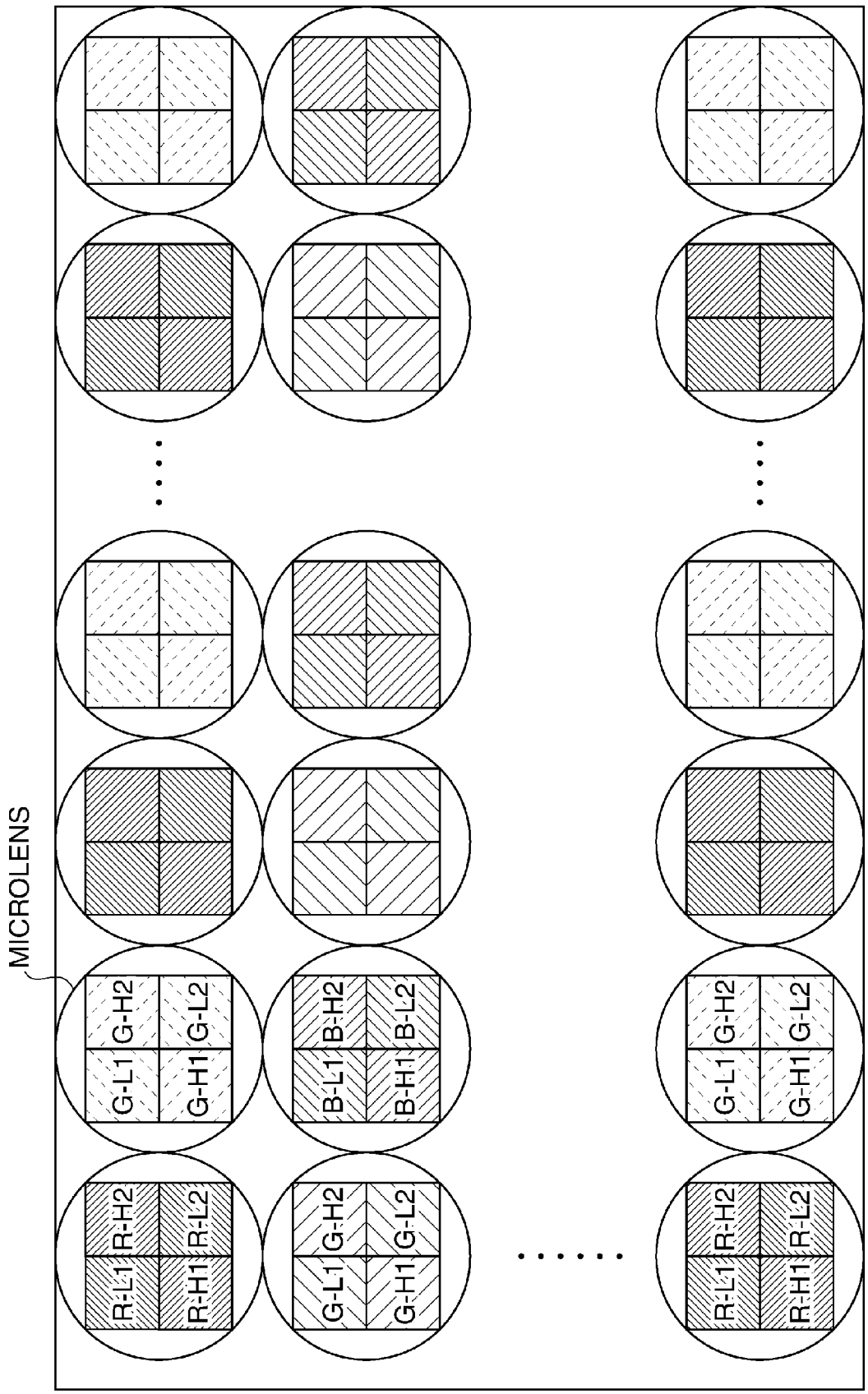
FIG. 7 is a diagram schematically showing a still other arrangement of pixels in the pixel unit appearing in FIG. 1.

FIG. 7 is a diagram schematically showing a still other exemplary arrangement of pixels in the pixel unit appearing in FIG. 1.

FIG. 7 shows a two-dimensional image of a light-incident surface of the solid-state image pickup apparatus, and here, as with the example described above with reference to FIG. 2, a primary colors Bayer pattern of R, G, and B is adopted. It should be noted that although the primary colors Bayer pattern is used here, a complementary colors Bayer pattern may be adopted.

In the example shown in the figure, four pixels correspond to one microlens, and here, a pixel group sharing one microlens is referred to as a sharing pixel group. First, in a vertical direction from a left side in the figure, a sharing pixel group (R sharing pixel group: R-L1, R-L2, R-H1, and R-H2) provided with R (red) color filters are placed. A sharing pixel group (G sharing pixel group: G-L1, G-L2, G-H1, and G-H2) provided with G (green) color filters are placed on a lower side of the R sharing pixel group. Subsequently, in the same way, R sharing pixel groups and G sharing pixel groups are alternately placed in a column direction.

A G sharing pixel group is then placed, and four pixels (B sharing pixel group: B-L1, B-L2, B-H1, and B-H2) provided with B (blue) color filters are placed on a lower side of the G sharing pixel group. Subsequently, in the same way, G sharing pixel groups and B sharing pixel groups are alternately placed in a column direction. After that, sharing pixel groups are placed in the same way.

In the example shown in the figure, sensitivities of pixels R-L1 and R-L2 to light are relatively lower as compared to pixels R-H1 and R-H2. Sensitivities of pixels G-L1 and G-L2 to light are relatively lower as compared to pixels G-H1 and G-H2, and sensitivities of pixels B-L1 and B-L2 to light are relatively lower as compared to pixels B-H1 and B-H2. Further, four pixels sharing one microlens are placed symmetrically with respect to a point.

As shown in the figure, second pixel groups (R-L1, R-L2, G-L1, G-L2, B-L1, or B-L2) having a second sensitivity and first pixel groups (R-H1, R-H2, G-H1, G-H2, B-H1, or B-H2) having a first sensitivity higher than the second sensitivity are alternately arranged in a column direction. In a row direction as well, second pixel groups (R-L1, R-L2, G-L1, G-L2, B-L1, or B-L2) having a second sensitivity and first pixel groups (R-H1, R-H2, G-H1, G-H2, B-H1, or B-H2) having a first sensitivity higher than the second sensitivity are alternately arranged.

Namely, in the example shown in FIG. 7 as well, first pixel groups having a first sensitivity and second pixel groups having a second sensitivity lower than the first sensitivity are alternately arranged in a row direction.

When the Bayer pattern shown in FIG. 7 is used, the solid-state image pickup apparatus outputs a signal, which is obtained by adding outputs from a pixel R-L1 and R-L2 together, as an output R-L (corresponding to R pixels of the second Bayer group 202 appearing in FIG. 2). Also, the solid-state image pickup apparatus outputs a signal, which is obtained by adding outputs from a pixel R-H1 and R-H2, as an output R-H (corresponding to R pixels of the first Bayer group 201 appearing in FIG. 2). This addition is performed by, for example, the signal processing circuit 170 appearing in FIG. 1. It should be noted that addition is performed in the same way with respect to pixels of B (blue) and G (green).

Thus, when four pixels share one microlens, misalignment of a low-sensitivity image and a high-sensitivity image does not occur. In the example shown in FIG. 2, a low-sensitivity image and a high-sensitivity image are generated according to pixels on which light is incident via different microlenses, and hence two taken images (a low-sensitivity image and a high-sensitivity image) are misaligned in a horizontal direction. This misalignment needs to be corrected for so as to generate an image with wide dynamic range.

As described above, according to the embodiment of the present invention, because pixel groups having different sensitivities to light are provided with respective A/D converters, and the A/D converters are controlled independently of one another, images with wide dynamic range can be obtained, and in addition, images can be taken at high frame rate.

As is apparent from the above description, in the example shown in FIG. 1, the column AMPs 230, the ramp circuit 240, the column ADCs 250, and the horizontal transfer circuit 260 act as a first signal processing unit. The column AMPs 130, the ramp circuit 140, the column ADCs 150, and the horizontal transfer circuit 160 act as a second signal processing unit.

The signal processing circuits 170 and 270 and the external output circuits 180 and 280 act as an output unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-032147 filed Feb. 21, 2013, which is hereby incorporated by reference herein in its entirety.

What is claimed is:

1. A solid-state image pickup apparatus, mounted on a camera, that has a pixel unit in which a plurality of pixels is arranged in a two-dimensional matrix and obtains image data based on pixel signals output from the pixels according to amounts of light incident on the pixels, the solid-state image pickup apparatus comprising:

the pixel unit having first pixels and second pixels, the first pixels and the second pixels being alternately arranged in a row direction;

a first signal processing unit configured to, when reading out the pixel signals from the pixel unit, read out the pixel signals from the first pixels as first pixel signals and perform analog-to-digital conversion of the first pixel signals to obtain first digital signals;

a second signal processing unit configured to, when reading out the pixel signals from the pixel unit, read out the pixel signals from the second pixels as second pixel signals and perform analog-to-digital conversion of the second pixel signals to obtain second digital signals; and an output unit configured to output the first digital signals and the second digital signals as image data, wherein, in a non-recording operation state in which power to the camera is turned on and the camera does not perform recording, at least one of said first signal processing unit and said second signal processing unit is selectively turned off.

2. A solid-state image pickup apparatus that has a pixel unit in which a plurality of pixels is arranged in a two-dimensional matrix and obtains image data based on pixel signals output from the pixels according to amounts of light incident on the pixels, comprising:
- the pixel unit having first pixels and second pixels, the first pixels and the second pixels being alternately arranged in a row direction;
- a first signal processing unit configured to, when reading out the pixel signals from the pixel unit, read out the pixel signals from the first pixels as first pixel signals and perform analog-to-digital conversion of the first pixel signals to obtain first digital signals;
- a second signal processing unit configured to, when reading out the pixel signals from the pixel unit read out the pixel signals from the second pixels as second pixel signals and perform analog-to-digital conversion of the second pixel signals to obtain second digital signals; and
- an output unit configured to output the first digital signals and the second digital signals as image data
- wherein, in a case where the camera is to perform shooting in a dynamic range determined in advance, both said first signal processing unit and said second signal processing unit are turned on.

3. A solid-state image pickup apparatus that has a pixel unit in which a plurality of pixels is arranged in a two-dimensional matrix and obtains image data based on pixel signals output from the pixels according to amounts of light incident on the pixels, comprising:
- the pixel unit having first pixels and second pixels, the first pixels and the second pixels being alternately arranged in a row direction;
- a first signal processing unit configured to, when reading out the pixel signals from the pixel unit read out the pixel signals from the first pixels as first pixel signals and perform analog-to-digital conversion of the first pixel signals to obtain first digital signals;
- a second signal processing unit configured to, when reading out the pixel signals from the pixel unit read out the pixel signals from the second pixels as second pixel signals and perform analog-to-digital conversion of the second pixel signals to obtain second digital signals; and
- an output unit configured to output the first digital signals and the second digital signals as image data,
- wherein, in a dynamic range other than a dynamic range determined in advance, one of said first signal processing unit and said second signal processing unit is turned off.

4. The solid-state image pickup apparatus according to claim 1, wherein according to a shooting mode, one of said first signal processing unit and said second signal processing unit is turned off.

5. The solid-state image pickup apparatus according to claim 1, wherein when both said first signal processing unit and said second signal processing unit are turned on, frequencies of clock signals supplied to said first signal processing unit and said second signal processing unit are controlled independently of each other.

6. A control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, comprising:
- a first signal processing step of, when reading out the pixel signals from the pixel unit, reading out the pixel signals from the first pixels as first pixel signals and performing analog-to-digital conversion of the first pixel signals to obtain first digital signals in a first signal processing unit;
- a second signal processing step of, when reading out the pixel signals from the pixel unit, reading out the pixel signals from the second pixels as second pixel signals and performing analog-to-digital conversion of the second pixel signals to obtain second digital signals in a second signal processing unit; and
- an output step of outputting the first digital signals and the second digital signals as image data,
- wherein, in a non-recording operation state in which power to the camera is turned on and the camera does not perform recording, at least one of the first signal processing unit and the second signal processing unit is turned off.

7. A non-transitory computer-readable storage medium storing a control program for causing a computer to implement a control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, the control method comprising:
- a first signal processing step of, when reading out the pixel signals from the pixel unit, reading out the pixel signals from the first pixels as first pixel signals and performing analog-to-digital conversion of the first pixel signals to obtain first digital signals in a first signal processing unit;
- a second signal processing step of, when reading out the pixel signals from the pixel unit, reading out the pixel signals from the second pixels as second pixel signals and performing analog-to-digital conversion of the second pixel signals to obtain second digital signals in a second signal processing unit; and
- an output step of outputting the first digital signals and the second digital signals as image data,
- wherein, in a non-recording operation state in which power to the camera is turned on and the camera does not perform recording, at least one of the first signal processing unit and the second signal processing unit is turned off.

8. The solid-state image pickup apparatus according to claim 1, wherein the first pixels have a first sensitivity to the light, and the second pixels have a second sensitivity lower than the first sensitivity.

9. The solid-state image pickup apparatus according to claim 2, wherein the first pixels have a first sensitivity to the light, and the second pixels have a second sensitivity lower than the first sensitivity.

10. The solid-state image pickup apparatus according to claim 3, wherein the first pixels have a first sensitivity to the light, and the second pixels have a second sensitivity lower than the first sensitivity.

11. A control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, comprising:
- a first signal step of, when reading out the pixel signals from the pixel unit, reading out the pixel signals from the first pixels as first pixel signals and perform analog-to-digital conversion of the first pixel signals to obtain first digital signals in a first signal processing unit;
a second signal step of, when reading out the pixel signals from the pixel unit, reading out the pixel signals from the second pixels as second pixel signals and perform analog-to-digital conversion of the second pixel signals to obtain second digital signals in a second signal processing unit; and
an output step of outputting the first digital signals and the second digital signals as image data,
wherein, in a case where the camera is to perform shooting in a dynamic range determined in advance, both said first signal processing step and said second signal processing step are turned on.

12. A non-transitory computer-readable storage medium storing a control program for causing a computer to implement a control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, the control method comprising:
a first signal processing step of, when reading out the pixel signals from the pixel unit, reading out the pixel signals from the first pixels as first pixel signals and perform analog-to-digital conversion of the first pixel signals to obtain first digital signals in a first signal processing unit;
a second signal processing step of, when reading out the pixel signals from the pixel unit, reading out the pixel signals from the second pixels as second pixel signals and perform analog-to-digital conversion of the second pixel signals to obtain second digital signals in a second signal processing unit; and
an output step of outputting the first digital signals and the second digital signals as image data
wherein in a case where the camera is to perform shooting in a dynamic range determined in advance, both the first signal processing unit and the second signal processing unit are turned on.

13. A control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, comprising:
a first signal processing step of, when reading out the pixel signals from the pixel unit, reading out the pixel signals from the first pixels as first pixel signals and perform analog-to-digital conversion of the first pixel signals to obtain first digital signals in a first signal processing unit;
a second signal processing step of, when reading out the pixel signals from the pixel unit, reading out the pixel signals from the second pixels as second pixel signals and perform analog-to-digital conversion of the second pixel signals to obtain second digital signals in a second signal processing unit; and
an output unit configured to output the first digital signals and the second digital signals as image data,
wherein, in a dynamic range other than a dynamic range determined in advance, one of the first signal processing unit and the second signal processing unit is turned off.

14. A non-transitory computer-readable storage medium storing a control program for causing a computer to implement a control method for a solid-state image pickup apparatus, mounted on a camera, that has a pixel unit in which a plurality of pixels is arranged in a two-dimensional matrix and obtains image data based on pixel signals output from the pixels according to amounts of light incident on the pixels, the pixel unit having first pixels and second pixels, the first pixels and the second pixels being alternately arranged in a row direction, the control method comprising:
a first signal processing step of, when reading out the pixel signals from the pixel unit, reading out the pixel signals from the first pixels as first pixel signals and perform analog-to-digital conversion of the first pixel signals to obtain first digital signals in a first signal processing unit;
a second signal step of, when reading out the pixel signals from the pixel unit, reading out the pixel signals from the second pixels as second pixel signals and perform analog-to-digital conversion of the second pixel signals to obtain second digital signals in a second signal processing unit; and
an output step of outputting the first digital signals and the second digital signals as image data,
wherein, in a dynamic range other than a dynamic range determined in advance, one of the first signal processing unit and said second signal processing unit is turned off.

* * * * *